United States Patent
Yamakita

(10) Patent No.: US 7,061,572 B2
(45) Date of Patent: Jun. 13, 2006

(54) LIQUID CRYSTAL DISPLAY DEVICE WITH PIXEL ELECTRODE CONNECTING PORTION AND STORAGE CAPACITOR ELECTRODE PERFORMING INITIALIZATION PROCESS

(75) Inventor: Hiroyuki Yamakita, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 40 days.

(21) Appl. No.: 10/485,650

(22) PCT Filed: Aug. 16, 2002

(86) PCT No.: PCT/JP02/08005

§ 371 (c)(1),
(2), (4) Date: Feb. 3, 2004

(87) PCT Pub. No.: WO03/014817

PCT Pub. Date: Feb. 20, 2003

(65) Prior Publication Data

US 2004/0183981 A1    Sep. 23, 2004

(30) Foreign Application Priority Data

Aug. 8, 2001 (JP) .............................. 2001-240783

(51) Int. Cl.
*G02F 1/1343* (2006.01)
*G02F 1/137* (2006.01)

(52) U.S. Cl. ..................... 349/191; 349/39; 349/143; 349/144; 349/146

(58) Field of Classification Search ................ 349/144, 349/146, 191, 39
See application file for complete search history.

(56) References Cited

U.S. PATENT DOCUMENTS

| | | | |
|---|---|---|---|
| 5,822,027 A * | 10/1998 | Shimada et al. ............... | 349/39 |
| 6,369,867 B1 * | 4/2002 | Ge ............................... | 349/73 |
| 6,603,525 B1 * | 8/2003 | Yamakita et al. ........... | 349/139 |
| 6,683,672 B1 * | 1/2004 | Ueda et al. .................. | 349/176 |

FOREIGN PATENT DOCUMENTS

| | | |
|---|---|---|
| JP | 4-83231 A | 3/1992 |
| JP | 4-130312 | 5/1992 |
| JP | 5-66415 A | 3/1993 |
| JP | 2000-221527 A | 8/2000 |
| JP | 2000-321556 A | 11/2000 |
| WO | WO 97/24640 A1 | 7/1997 |

OTHER PUBLICATIONS

Machine translation of JP 2000-221527.*

* cited by examiner

*Primary Examiner*—Andrew Schechter
(74) *Attorney, Agent, or Firm*—McDermott Will & Emery LLP

(57) ABSTRACT

In a liquid crystal display of the present invention, a pixel electrode (6) provided on each pixel is comprised of rectangular first electrode (6a) and second electrode (6b) and a connecting portion (6c) connecting the first electrode (6a) to the second electrode (6b). The connecting portion (6c) has a transverse sectional area smaller than those of the first electrode (6a) and the second electrode 6(*b*). Upon a current having a predetermined value or more flowing through the connecting portion (6c), the first electrode (6a) and the second electrode (6b) are electrically disconnected.

10 Claims, 6 Drawing Sheets

LIQUID CRYSTAL DISPLAY DEVICE WITH PIXEL ELECTRODE CONNECTING PORTION AND STORAGE CAPACITOR ELECTRODE PERFORMING INITIALIZATION PROCESS

TECHNICAL FIELD

The present invention relates to a liquid crystal display for displaying an image. More particularly, the present invention relates to a liquid crystal display using a field sequential color method.

BACKGROUND ART

As a method for implementing color display in a liquid crystal display, there has been widely used a color filter method in which white light is adapted to travel through color filters of three primary colors (red, green, and blue) provided for respective pixels, thereby conducting color display. In this color filter method, however, when light emitted from the light source travels through the color filter, only light having a specific wavelength is selected and transmitted, and light having the other wavelengths is absorbed. For this reason, light availability is low and power consumption is increased.

Accordingly, there has been proposed a field sequential color method for conducting color display by lighting a plurality of light sources adapted to emit different color lights by time division. In this field sequential color method, lights emitted from the respective light sources are directly used for image display without traveling through the color filters. This results in high light availability and reduced power consumption. In addition, cost is reduced because of absence of the color filters.

Since the liquid crystal display using the above color filter method implements color display using the color filters of three primary colors, it is necessary to conduct display for each set of three pixels, i.e., red, green, and blue pixels. On the other hand, since the liquid crystal display using the field sequential color method implements color display by lighting the respective color lights by time division, display is conducted for each pixel. So, to achieve an equal resolution on an equally-sized display panel, the size of pixels in the liquid crystal display using the field sequential color method is three times as large as the size of the pixels in the liquid crystal display using the color filter method.

However, if the pixels are thus large-sized, it is highly probable that substances mixed in a liquid crystal layer causes dot defects. The dot defects makes the image noticeably degraded because of the large-sized pixels.

In the liquid crystal display using the field sequential color method, one frame period of a video signal is comprised of a plurality of sub-frame periods, and it is necessary for liquid crystal to complete a response within each of the sub-frame periods. If the liquid crystal responds slowly, satisfactory image display is impossible to achieve. It is therefore desirable to use an OCB (Optically Self-Compensated Birefringence) mode liquid crystal capable of high-speed response.

In the liquid crystal display having the OCB-mode liquid crystal, by applying a relatively high voltage across a pixel electrode and a counter electrode, an alignment state of the liquid crystal is caused to transition from so-called splay alignment to bend alignment, and in this bend alignment state, an image is displayed. Hereinbelow, the transition from the splay alignment to the bend alignment is called splay to bend transition. With regard to the liquid crystal display having the OCB-mode liquid crystal, see "Syadanhojin Denki Tsushin Gattsukai Shingakugihou, EDI98–144, 199P."

In the liquid crystal display having the OCB-mode liquid crystal, due to incomplete splay to bend transition, the liquid crystal partially remains in the splay alignment. In this case, the image is not normally displayed in pixels corresponding to the splay alignment liquid crystal, this would be observed as dot defects by an observer. As described above, since degradation of the image due to the dot defects is noticeable in the case of the large-sized pixels, it is required that the splay to bend transition take place more reliably.

DISCLOSURE OF THE INVENTION

The present invention has been developed under the circumstances, and an object of the present invention is to provide a liquid crystal display capable of achieving satisfactory image display without occurrence of dot defects.

To achieve this objects, according to the present invention, there is provided a liquid crystal display comprising: a first substrate having a plurality of pixel electrodes arranged in matrix; a second substrate opposed to the first substrate; a liquid crystal layer comprised of liquid crystal interposed between the first and second substrates; a counter electrode provided on the second substrate; an illuminating device having a light source for emitting lights of at least three colors, the illuminating device being configured to sequentially emit the lights of a plurality of colors toward the liquid crystal layer in one frame period; and a drive means for driving the liquid crystal by generating potential difference between each of the pixel electrodes and the counter electrode and adjusting transmittance of the lights emitted from the illuminating device in the liquid crystal layer, wherein the pixel electrodes are each comprised of first and second electrodes and a connecting portion connecting the first electrode to the second electrode, and the connecting portion is configured to electrically disconnect the first and second electrodes from each other, upon a current having a predetermined value or more flowing through the connecting portion.

With this configuration, in the case where the first electrode and the counter electrode are rendered electrically conductive due to substances mixed in the liquid crystal layer, upon a voltage corresponding to a video signal being applied across the pixel electrode and the counter electrode, an excess current flows through the connecting portion, thereby causing the first and second electrodes to be electrically disconnected from each other. As a result, since the second electrode functions as the pixel electrode, dot defects are made less noticeable.

As a matter of course, the predetermined value varies depending on the transverse sectional area and material of the connecting portion of the pixel electrode.

According to the present invention, there is provided a liquid crystal display comprising: a first substrate having a plurality of pixel electrodes arranged in matrix; a second substrate opposed to the first substrate; a liquid crystal layer comprised of liquid crystal interposed between the first and second substrates; a counter electrode provided on the second substrate; an illuminating device having a light source for emitting lights of at least three colors, the illuminating device being configured to sequentially emit the lights of a plurality of colors toward the liquid crystal layer in one frame period; and a drive means for driving the liquid crystal by generating potential difference between each of the pixel electrodes and the counter electrode and adjusting transmittance of the lights emitted from the illuminating device in the liquid crystal layer, wherein the pixel electrodes are each comprised of first and second electrodes and a connecting portion connecting the first electrode to the second electrode, and the connecting portion has a transverse sectional area smaller than transverse sectional areas of the first and second electrodes.

Preferably, in the liquid crystal display of the present invention, the first and second electrodes are rectangular, and the connecting portion has a width smaller than widths of the first and second electrodes.

Preferably, in the liquid crystal display of the present invention, each pixel is provided with a storage capacitor electrode, and the connecting portion is disposed in a region overlapping with the storage capacitor electrode with an insulator interposed between them.

With this configuration, an aperture ratio is not reduced regardless of the connecting portion.

Preferably, in the liquid crystal display of the present invention, an alignment state of the liquid crystal in a display state and an alignment state of the liquid crystal in a non-display state differ from each other, the liquid crystal being subjected to an initialization process so as to be changed from the alignment state in the non-display state to the alignment state in the display state, before an image is displayed, and the drive means is configured to perform the initialization process by generating potential difference between the connecting portion and the storage capacitor electrode.

Such a liquid crystal display has OCB-mode liquid crystal in which the alignment state in the non-display state is splay alignment and the alignment state in the display state is bend alignment.

Preferably, in the liquid crystal display of the present invention, the first electrode is provided with at least one protrusion on a side edge thereof opposed to the second electrode, in a region overlapping with the storage capacitor electrode with the insulator interposed between the first electrode and the storage capacitor electrode, and the second electrode is provided with a concave portion on a side edge thereof opposed to the first electrode as corresponding to the protrusion in a region overlapping with the storage capacitor electrode with the insulator interposed between the second electrode and the storage capacitor electrode.

With this configuration, since an electric field is generated between the protrusion and the concave portion, the alignment state of the liquid crystal can easily transition from the alignment state in the non-display state to the alignment state in the display state.

Preferably, in the liquid crystal display of the present invention, refractive index anisotropy of the liquid crystal is 0.14 to 0.21.

Preferably, in the liquid crystal display of the present invention, dielectric constant anisotropy of the liquid crystal is 8 to 12.

This object, as well as other objects, features and advantages of the invention will become more apparent to those skilled in the art from the following description taken with reference to the accompanying drawings.

BEST MODE FOR CARRYING OUT THE INVENTION

Hereinafter, embodiments of the present invention will be described with reference to the accompanying drawings.

Embodiment 1

Figure 1:
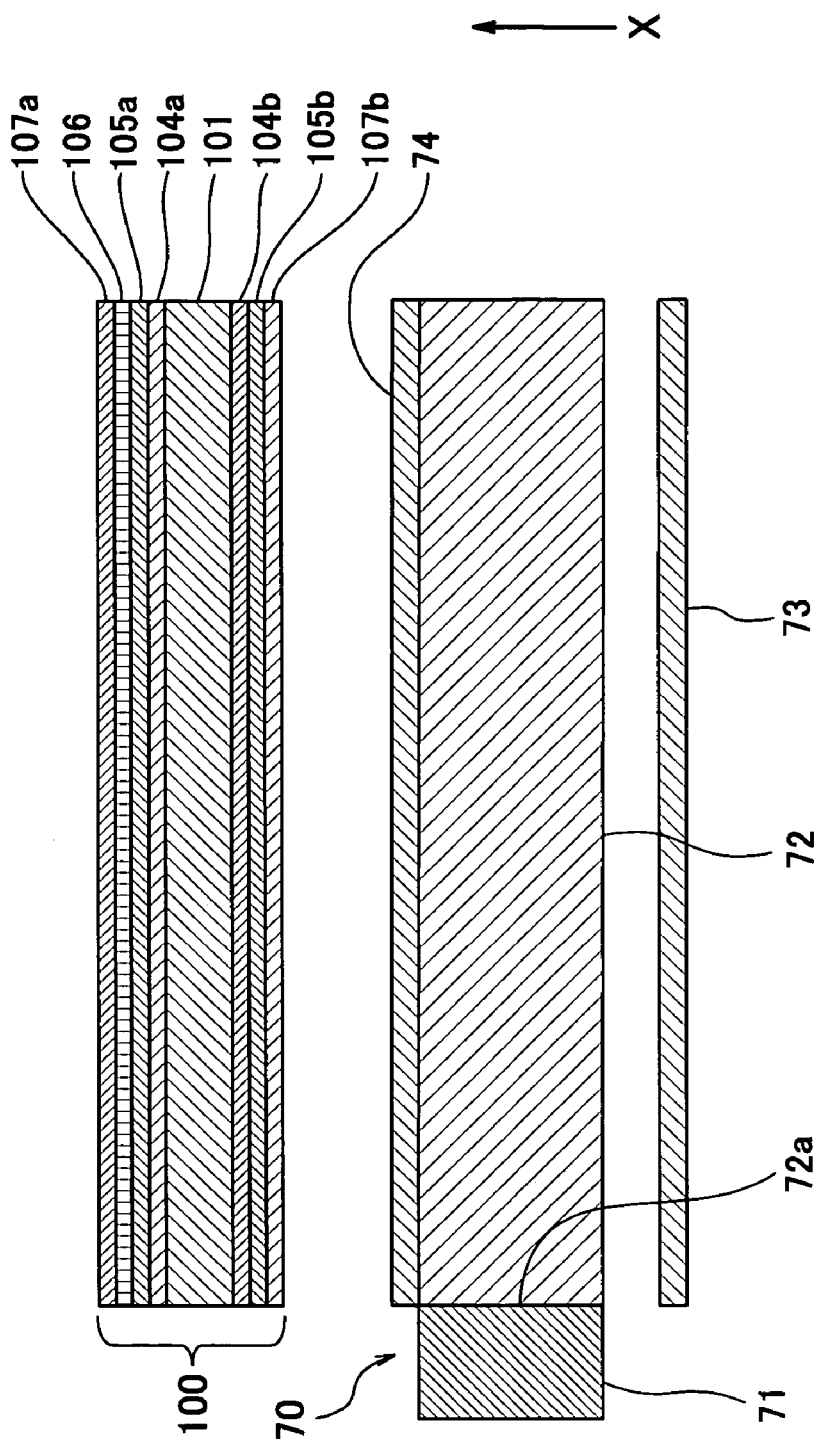
FIG. 1 is a cross-sectional view schematically showing a configuration of a liquid crystal display according to a first embodiment of the present invention.

FIG. 1 is a cross-sectional view schematically showing a configuration of a liquid crystal display according to a first embodiment of the present invention. In FIG. 1, for the sake of convenience, X direction indicates an upward direction of a liquid crystal display panel.

As shown in FIG. 1, the liquid crystal display according to this embodiment comprises a liquid crystal display panel 100 and a backlight 70 disposed under the liquid crystal display panel 100.

The liquid crystal display panel 100 has a liquid crystal cell 101 mentioned later. On an upper surface of the liquid crystal cell 101, a retardation film (hereinafter simply referred to as a negative retardation film) 104a comprised of an optical medium having a negative refractive index with main axes having a hybrid arrangement, a negative uniaxial retardation film 105a, a positive uniaxial retardation film 106, and a polarizer 107a are disposed in this order. On a lower surface of the liquid crystal cell 101, a negative retardation film 104b, a negative uniaxial retardation film 105b, and a polarizer 107b are disposed in this order. It should be appreciated that, since a biaxial retardation film serves as both of a negative uniaxial retardation film and a positive uniaxial retardation film, a negative retardation film 104, the biaxial retardation film (not shown), and the polarizer may be disposed on each of the both surfaces of the liquid crystal cell.

The backlight 70 comprises a light guiding plate 72 made of a transparent rectangular synthetic-resin board, a light source 71 placed in the vicinity of an end face 72a of the light guiding plate 72 as opposed to the end face 72a, a reflector 73 placed below the light guiding plate 72, and a diffusing sheet 74 provided on an upper surface of the light guiding plate 72.

The light source 71 is a LED array in which LEDs (light-emitting diodes) for emitting lights of three primary colors—red, green, and blue, are sequentially and repeatedly arranged.

In the backlight 70 so configured, the light emitted from the light source 71 is incident on the light guiding plate 72 through the endface 72a. The incident light is multiple-scattered inside the light guiding plate 72 and emanates from the entire upper surface thereof. In this case, the light leaking downward from the light guiding plate 72 and incident on the reflector 73 is reflected by the reflector 73 and returned to the inside of the light guiding plate 72. The light emanating from the light guiding plate 72 is diffused by the light diffusing sheet 74 and the resulting diffused light is incident on the liquid crystal display panel 100. Thereby, the liquid crystal display panel 100 is entirely and uniformly irradiated with red, green, or blue light.

Figure 2:
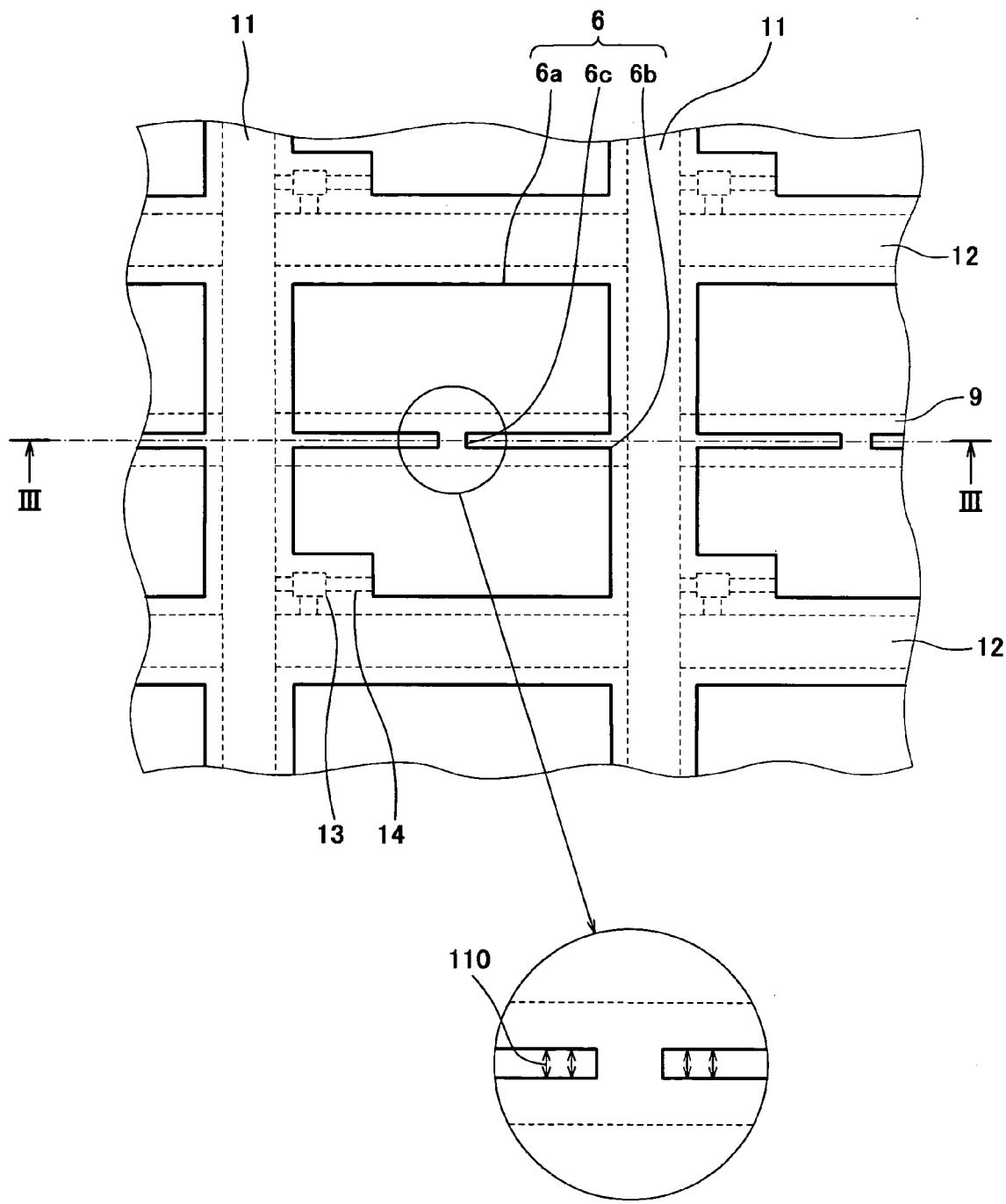
FIG. 2 is a plan view schematically showing a structure of a liquid crystal cell included in the liquid crystal display according to the first embodiment of the present invention.
Figure 3:
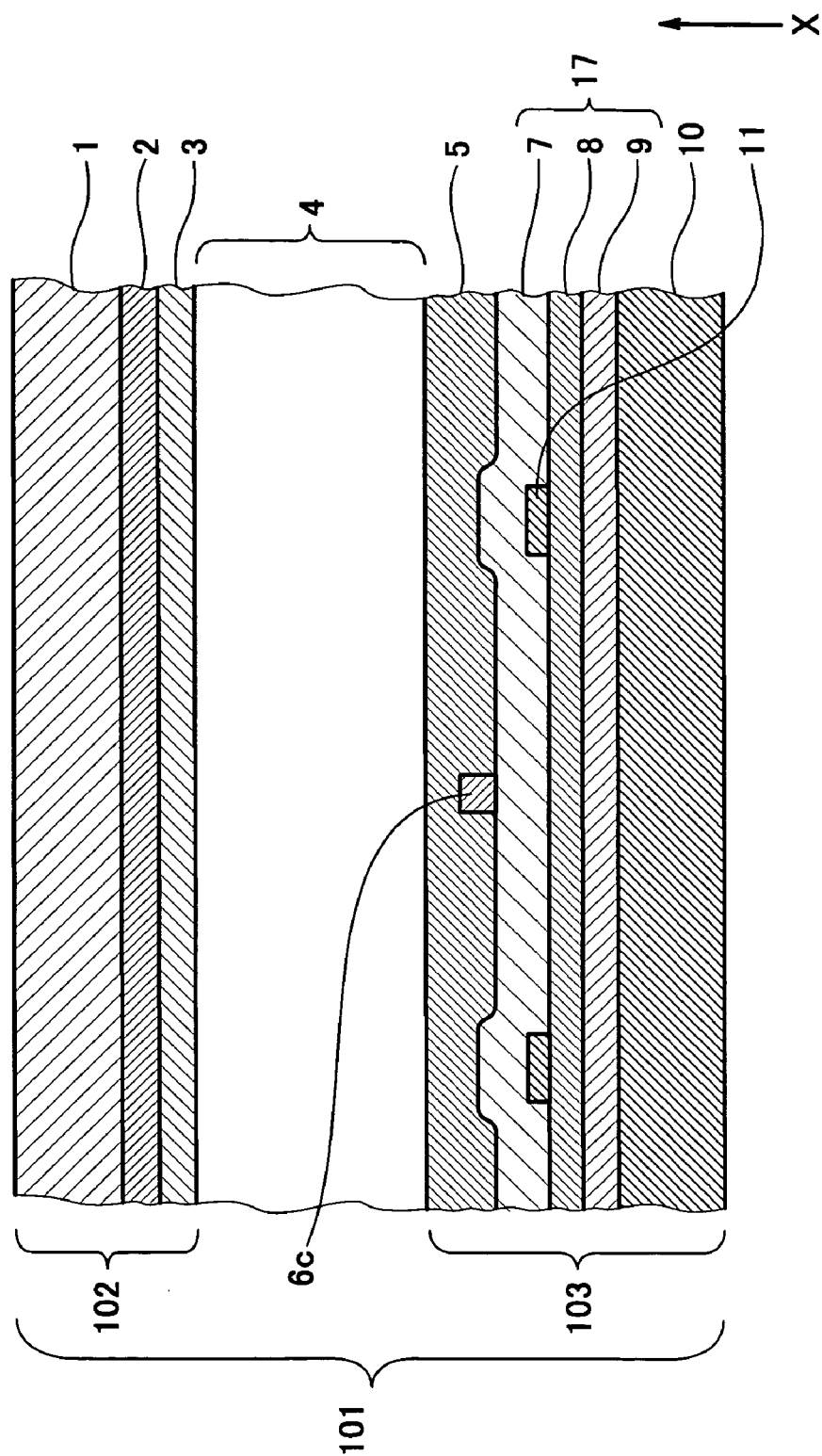
FIG. 3 is a cross-sectional view taken in the direction of arrows along line III—III in FIG. 2.
Figure 4:
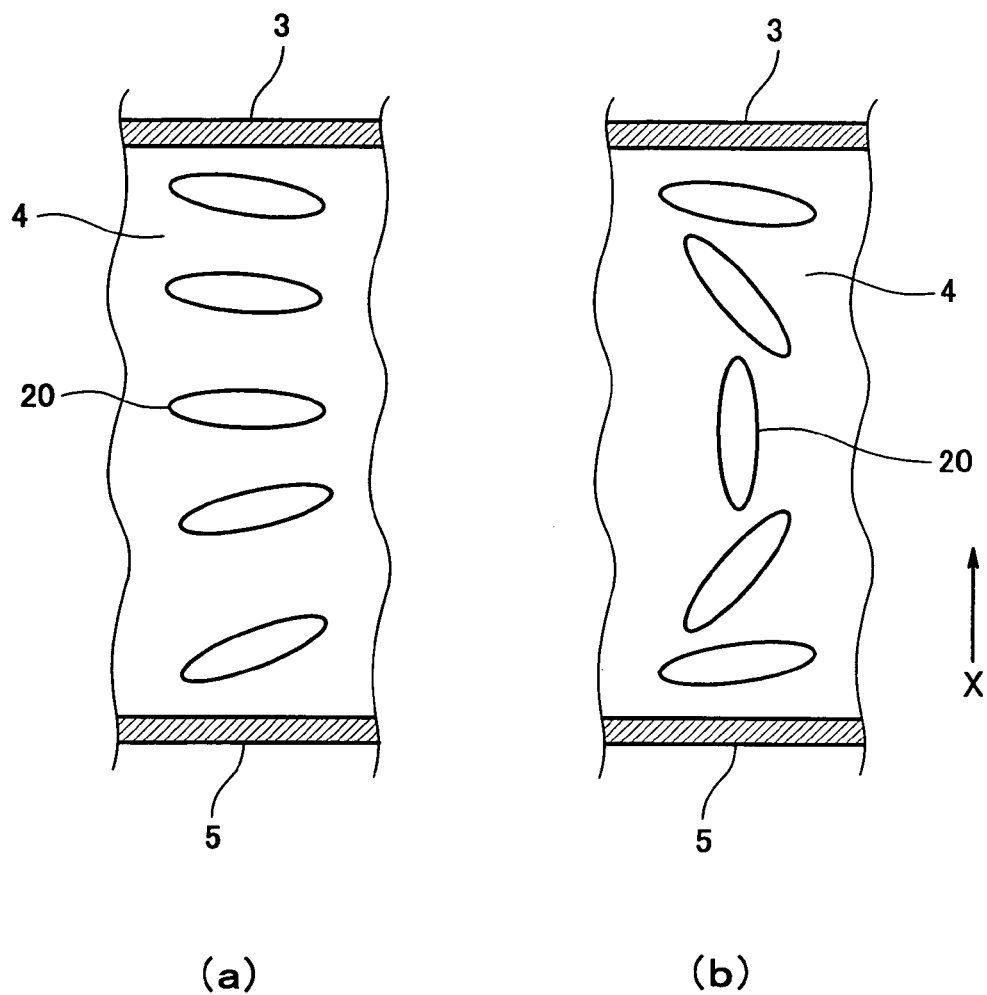
FIG. 4 is an enlarged view of a liquid crystal layer portion in FIG. 3.

FIG. 2 is a plan view schematically showing a structure of the liquid crystal cell 101. FIG. 3 is a cross-sectional view taken in the direction of arrows along line III—III in FIG. 2. FIG. 4 is an enlarged view of a liquid crystal layer portion in the cross-section. In FIG. 2, for the sake of convenience, constituents provided above pixel electrodes are omitted.

As shown in FIGS. 2 and 3, the liquid crystal cell 101 comprises two substrates, i.e., an array substrate 103 and an opposing substrate 102 disposed as opposed to the array substrate 103 with a spacer (not shown) interposed between them. A liquid crystal layer 4 contains liquid crystal molecules filled into a gap between the opposing substrate 102 and the array substrate 103.

The opposing substrate 102 is structured such that a transparent electrode (counter electrode) 2 and an alignment layer 3 made of polyimide or the like are disposed on a lower surface of a glass substrate 1.

Meanwhile, the array substrate 103 has a glass substrate 10. On an upper surface of the glass substrate 10, a wiring layer 17 is provided. The wiring layer 17 has gate lines 12 and source lines 11 being arranged to cross each other, storage capacitor electrodes 9, and an insulator for preventing conduction between these electrodes. In greater detail, the storage capacitor electrodes 9 are each disposed between and in parallel with the gate lines 12. The gate lines 12 and the storage capacitor electrodes 9 are formed in the same layer located at a lowermost position. An insulating layer 8 covers the gate lines 12 and the storage capacitor electrodes 9. The source lines 11 are disposed on an upper surface of the insulating layer 8. An insulating layer 7 covers the source lines 11.

On an upper surface of the wiring layer 17, pixel electrodes 6 comprised of an ITO (Indium Tin Oxide) film as a transparent conductor are each located within a region defined by the gate lines 12 and the source lines 11. The pixel electrodes 6 are each comprised of first and second electrodes 6a and 6b which are rectangular, and a connecting portion 6c connecting the second electrode 6a to the second electrode 6b. Herein, a width of the connecting portion 6c is smaller than widths of the first and the second electrodes 6a and 6b. Therefore, a transverse sectional area of the connecting portion 6c is smaller than those of the first and second electrodes 6a and 6b.

Instead of setting the width of the connecting portion 6c smaller than those of the first and second electrodes 6a and 6b, a thickness of the connecting portion 6c may be set smaller than thicknesses of the first and second electrode 6a and 6b to make the transverse sectional area of the connecting portion 6c smaller than those of the first and second electrodes 6a and 6b.

Since the storage capacitor electrode 9 is located between the gate lines 12, the pixel electrode 6 has a region overlapping with the storage capacitor electrode 9 with the insulating layers 7 and 8 interposed between them. Within the overlapping region, the connecting portion 6c is located. By providing the connecting portion 6c in the region overlapping with the storage capacitor electrode 9, an aperture ratio is not reduced.

The alignment layer 5 made of polyimide or the like covers the pixel electrodes 6 and the wiring layer 17. The alignment layer 5 and the alignment layer 3 provided on the opposing substrate 102 side have been subjected to an alignment process such as known rubbing treatment to align the liquid crystal molecules within the liquid crystal layer 4 in parallel and in the same direction. In this embodiment, the direction of the alignment process is parallel to the source lines 11.

Reference numeral 13 denotes a TFT (Thin Film Transistor) as a semiconductor switching device and reference numeral 14 denotes a drain electrode connecting the TFT 13 to the pixel electrode 6.

In an initial state of the liquid crystal display panel 100 so configured, the liquid crystal molecules 20 have splay alignment as shown in FIG. 4($a$). In the liquid crystal display of this embodiment, a predetermined voltage is applied to the liquid crystal display panel 100 as mentioned later, to cause the alignment state of the liquid crystal molecules 20 to transition from the splay alignment to bend alignment as shown in FIG. 4($b$). In the bend alignment state, the image is displayed. That is, the liquid crystal display panel 100 is an OCB-mode display panel. Hereinafter, the voltage applied to the liquid crystal display panel 100 to cause the alignment state of the liquid crystal molecules 20 to transition from the splay alignment to the bend alignment, is called a transition voltage.

In general, a retardation $\Delta n d$ of the liquid crystal layer defined as a product of a thickness d of the liquid crystal layer and refractive index anisotropy $\Delta n$ of the liquid crystal molecules is preferably between 600 nm and 900 nm, based on a relationship with the retardation film.

Accordingly, in this embodiment, the thickness (cell gap) of the liquid crystal layer 4 is set between 4 μm and 6 μm, and the refractive index anisotropy $\Delta n$ of the liquid crystal molecules 20 is set between 0.14 and 0.21 in view of the fact that reliability is significantly degraded if the refractive index anisotropy $\Delta n$ of the liquid crystal molecules is greater than 0.21.

Dielectric constant anisotropy of the liquid crystal molecules 20 is set between 8 and 12 for the purpose of a low drive voltage and reliability of the liquid crystal molecules.

Figure 5:
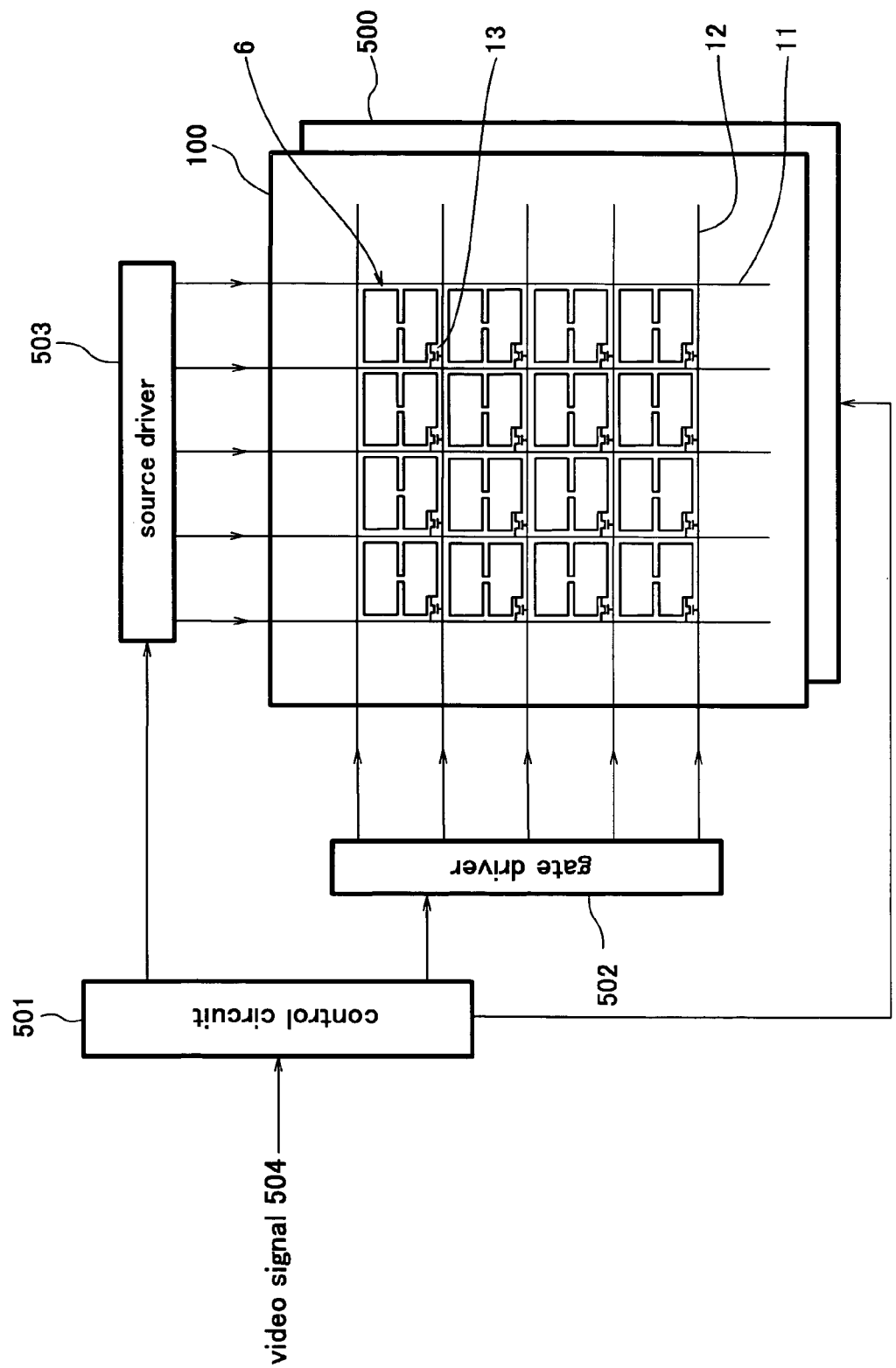
FIG. 5 is a block diagram showing a configuration of the liquid crystal display according to the first embodiment of the present invention.

FIG. 5 is a block diagram showing a configuration of a liquid crystal display according to the first embodiment of the present invention. Referring to FIGS. 2, 3, and 5, the liquid crystal display panel 100 is a well-known TFT (Thin Film Transistor)-type display panel, and the gate lines 12 and the source lines 11 are arranged in matrix as described above. The gate lines 12 and the source lines 11 of the liquid crystal display panel 100 are driven by a gate driver 502 and a source driver 503, respectively, and an operation of the gate driver 502 and an operation of the source driver 503 are controlled by a control circuit 501.

In the liquid crystal display according to the embodiment, in one frame period, the control circuit 501 outputs a control signal to the backlight 70 to cause LEDs as the light source of the backlight 70 to sequentially emit lights in the order of red, green, and blue, in a predetermined cycle. To conduct display in synchronization with the lights, the control circuit 501 also outputs control signals to the gate driver 502 and the source driver 503, respectively, according to a video signal 504 externally input. As a result, the gate driver 502 applies scan signal voltages to the gate lines 12, thereby causing TFTs 13 of pixels to be sequentially turned on, while, according to the timing, the source driver 503 sequentially applies voltages corresponding to the video signal 504 to the pixel electrodes 6 of the respective pixels through the source lines 11. Thereby, the liquid crystal molecules 20 are modulated and transmittance of the light emitted from the backlight 70 changes. As a result, an image corresponding to the video signal 504 is visible to a viewer observing the liquid crystal display.

As described above, the LEDs of the backlight 70 sequentially emit lights in the order of red, green and blue, but the order is not intended to be limited to this. For example, lights may be emitted in the order of blue, green and red.

Next, an operation of the liquid crystal display according to the embodiment will be described in conjunction with application of the transition voltage to the liquid crystal display panel 100.

As described previously, to conduct image display in the liquid crystal display according to this embodiment, the splay to bend transition needs to take place. To this end, in the liquid crystal display of this embodiment, the transition voltage is applied across the pixel electrode 6 and the storage capacitor electrode 9 before image display is conducted. Here, the transition voltage is set to approximately 25V.

Upon application of the transition voltage, strong electric field concentration occurs in the vicinity of the connecting portion 6c of the pixel electrode 6. As shown in FIG. 2, an electric field in a transverse direction (direction parallel to the substrate) indicated by arrows 110 (hereinafter referred to as a transverse electric field) is generated between the first electrode 6a and the second electrode 6b. As a result, the liquid crystal molecules 20 arranged in the vicinity of the connecting portion 6c of each pixel electrode 6 become a transition nucleus, which is grown, thus achieving splay to bend transition. That is, the liquid crystal molecules 20 arranged in the vicinity of the connecting portion 6c becomes the transition nucleus, and thereby the splay to bend transition smoothly takes place.

As should be appreciated, in the liquid crystal display of this embodiment, since the liquid crystal molecules 20 arranged in the vicinity of the connecting portion 6c of each pixel electrode 6 become the transition nucleus, the splay to bend transition reliably takes place. Consequently, satisfactory image display is achieved without dot defects.

Subsequently, an event that dot defects occur due to substances mixed in the liquid crystal layer, will be described.

Commonly, in the liquid crystal display, the pixel electrode and the counter electrode are rendered electrically conductive for some reason, for example, due to substances mixed in the liquid crystal layer. In this case, potential difference between the pixel electrode and the counter electrode becomes zero, and therefore, the liquid crystal molecules within the pixel corresponding to the pixel electrode is not modulated. For this reason, in this pixel, the image is not normally displayed and dot defect occurs.

In the liquid crystal display of this embodiment, if substances are mixed in the liquid crystal layer 4 in the vicinity of the first electrode 6a of the pixel electrode 6, the first electrode 6a and the counter electrode 2 might be rendered electrically conductive. In this case, if a predetermined voltage is applied across the pixel electrode 6 and the counter electrode 2, an excess current flows through the connecting portion 6c having the transverse sectional area smaller than that of the first electrode 6a. As a result, the first electrode 6a and the second electrode 6b are electrically disconnected. In other words, the first electrode 6a and the second electrode 6b are electrically divided. Under the condition, since the second electrode 6b functions as a normal pixel electrode, a region of the dot defects can be reduced in contrast to the conventional liquid crystal display, although an area capable of normally displaying the image is reduced to half. This follows that the dot defects become less noticeable than in the conventional liquid crystal display even in the case of the large-sized pixels.

Embodiment 2

Figure 6:
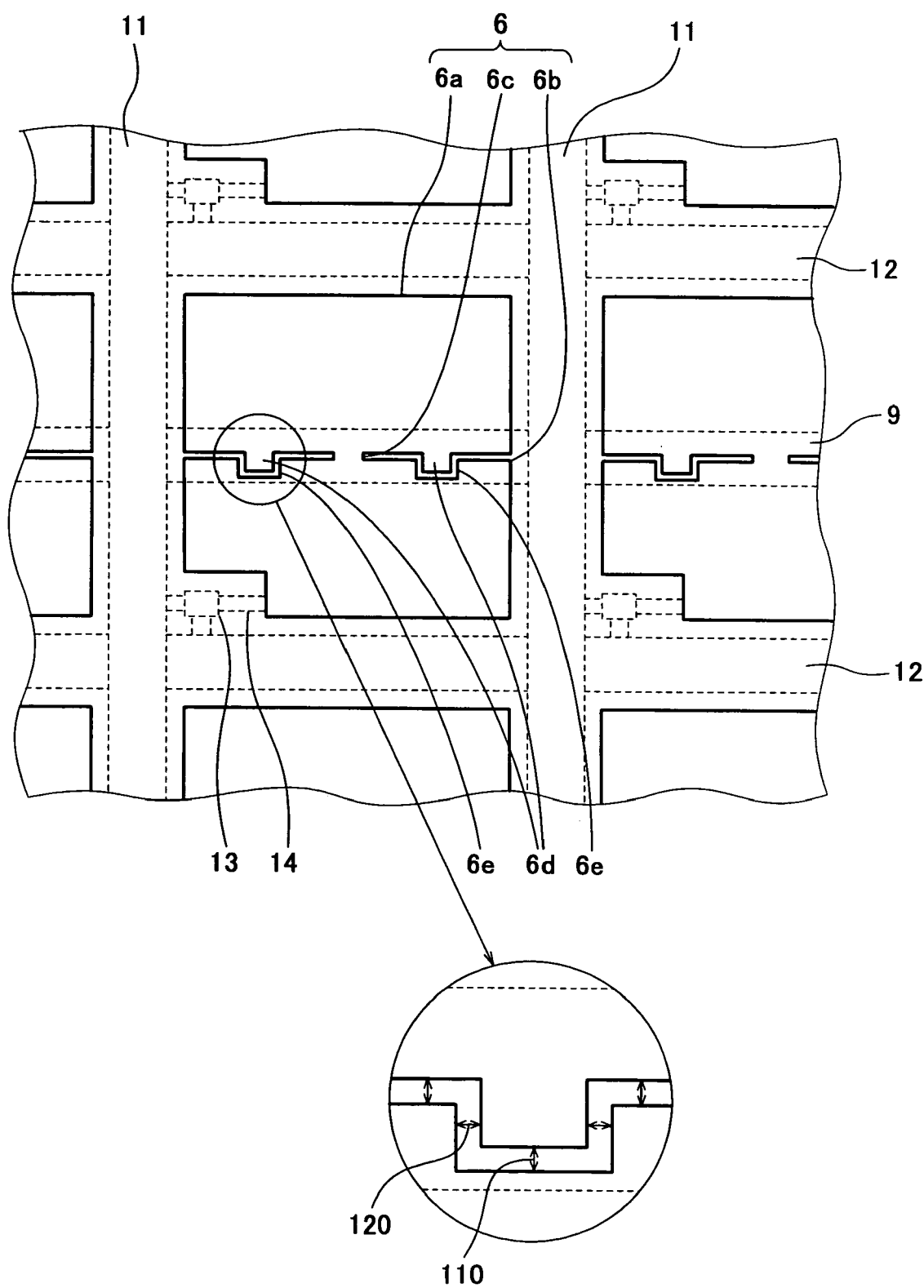
FIG. 6 is a plan view schematically showing a liquid crystal cell included in a liquid crystal display according to a second embodiment of the present invention.

FIG. 6 is a plan view schematically showing a structure of a liquid crystal cell included in a liquid crystal display according to a second embodiment of the present invention. As shown in FIG. 6, the first electrode 6a of the pixel electrode 6 is provided with two protrusions 6d on a side edge thereof opposed to the second electrode 6b. The second electrode 6b is provided with concave portions 6e on a side edge thereof opposed to the first electrode 6a so as to correspond to the two protrusions 6d. These protrusions 6d and the concave portions 6e are disposed in a region overlapping with the storage capacitor electrode 9.

The other structure of the liquid crystal display of this embodiment is identical to that of the first embodiment, and will not be further described.

In the liquid crystal display of this embodiment so configured, upon application of the transition voltage across the pixel electrode 6 and the storage capacitor electrode 9, strong electric field concentration occurs in the vicinity of the connecting portion 6c and in the vicinity of a region between each of the protrusions 6d and the corresponding concave portion 6e. In addition, as shown in FIG. 6, a transverse electric field is generated between the first electrode 6a and the second electrode 6b in two directions as indicated by arrows 110 and 120. As a result, the splay to bend transition takes place more reliably than in the first embodiment.

While the number of the protrusions 6d and the concave portions 6e corresponding to the protrusions 6d are respectively two, as a matter of course, the similar effects are obtained by providing one or more protrusions and concave portions.

Thus, by the reliable splay to bend transition, occurrence of the dot defects can be prevented. Thereby, a satisfactory image display is achieved.

Numerous modifications and alternative embodiments of the invention will be apparent to those skilled in the art in the light of the foregoing description. Accordingly, the description is to be construed as illustrative only, and is provided for the purpose of teaching those skilled in the art the best mode of carrying out the invention. The details of the structure and/or function may be varied.

INDUSTRIAL APPLICABILITY

A liquid crystal display of the present invention is useful as a display for use in a liquid crystal television, a liquid crystal monitor, or small electronic instruments such as a portable phone and a view finder.

The invention claimed is:
1. A liquid crystal display comprising:
a first substrate having a plurality of pixel electrodes arranged in matrix;
a second substrate opposed to the first substrate;
a liquid crystal layer comprised of liquid crystal interposed between the first and second substrates;
a counter electrode provided on the second substrate;
an illuminating device having a light source for emitting lights of at least three colors, the illuminating device being configured to sequentially emit the lights of a plurality of colors toward the liquid crystal layer in one frame period; and a drive means for driving the liquid crystal by generating potential difference between each of the pixel electrodes and the counter electrode and adjusting transmittance of the lights emitted from the illuminating device in the liquid crystal layer, wherein the pixel electrodes are each comprised of first and second electrodes and a connecting portion connecting the first electrode to the second electrode, the connecting portion has a transverse sectional area smaller than transverse sectional areas of the first and second electrodes, each pixel is provided with a storage capacitor electrode, the connecting portion is disposed in a region overlapping with the storage capacitor electrode with an insulator interposed between them, an alignment state of the liquid crystal in a display state and an alignment state of the liquid crystal in a non-display state differ from each other, the liquid crystal being subjected to an initialization process so as to be changed from the alignment state in the non-display state to the alignment state in the display state before an image is displayed, and the drive means is configured to perform the initialization process by generating potential difference between the connecting portion and the storage capacitor electrode.

2. The liquid crystal display according to claim 1, wherein the alignment state in the non-display state is splay alignment and the alignment state in the display state is bend alignment.

3. The liquid crystal display according to claim 1, wherein the first electrode is provided with at least one protrusion on a side edge thereof opposed to the second electrode, in a region overlapping with the storage capacitor electrode with the insulator interposed between the first electrode and the storage capacitor electrode, and the second electrode is provided with a concave portion on a side edge thereof opposed to the first electrode as corresponding to the protrusion in a region overlapping with the storage capacitor electrode with the insulator interposed between the second electrode and the storage capacitor electrode.

4. The liquid crystal display according to claim 1, wherein refractive index anisotropy of the liquid crystal is 0.14 to 0.21.

5. The liquid crystal display according to claim 1, wherein dielectric constant anisotropy of the liquid crystal is 8 to 12.

6. A liquid crystal display comprising:
a first substrate having a plurality of pixel electrodes arranged in matrix;
a second substrate opposed to the first substrate;
a liquid crystal layer comprised of liquid crystal interposed between the first and second substrates;
a counter electrode provided on the second substrate;
an illuminating device having a light source for emitting lights of at least three colors, the illuminating device being configured to sequentially emit the lights of a plurality of colors toward the liquid crystal layer in one frame period; and
a drive means for driving the liquid crystal by generating potential difference between each of the pixel electrodes and the counter electrode and adjusting transmittance of the lights emitted from the illuminating device in the liquid crystal layer, wherein the pixel electrodes are each comprised of first and second electrodes and a connecting portion connecting the first electrode to the second electrode, the connecting portion is configured to electrically disconnect the first and second electrodes from each other, upon a current having a predetermined value or more flowing through the connecting portion, each pixel is provided with a storage capacitor electrode, the connecting portion is disposed in a region overlapping with the storage capacitor electrode with an insulator interposed between them, an alignment state of the liquid crystal in a display state and an alignment state of the liquid crystal in a non-display state differ from each other, the liquid crystal being subjected to an initialization process so as to be changed from the alignment state in the non-display state to the alignment state in the display state before an image is displayed, and the drive means is configured to perform the initialization process by generating potential difference between the connecting portion and the storage capacitor electrode.

7. The liquid crystal display according to claim 6, wherein the alignment state in the non-display state is splay alignment and the alignment state in the display state is bend alignment.

8. The liquid crystal display according to claim 6, wherein the first electrode is provided with at least one protrusion on a side edge thereof opposed to the second electrode, in a region overlapping with the storage capacitor electrode with the insulator interposed between the first electrode and the storage capacitor electrode, and the second electrode is provided with a concave portion on a side edge thereof opposed to the first electrode as corresponding to the protrusion in a region overlapping with the storage capacitor electrode with the insulator interposed between the second electrode and the storage capacitor electrode.

9. The liquid crystal display according to claim 6, wherein refractive index anisotropy of the liquid crystal is 0.14 to 0.21.

10. The liquid crystal display according to claim 6, wherein dielectric constant anisotropy of the liquid crystal is 8 to 12.

* * * * *

UNITED STATES PATENT AND TRADEMARK OFFICE
CERTIFICATE OF CORRECTION

| | | |
|---|---|---|
| PATENT NO. | : 7,061,572 B2 | Page 1 of 1 |
| APPLICATION NO. | : 10/485650 | |
| DATED | : June 13, 2006 | |
| INVENTOR(S) | : Hiroyuki Yamakita | |

It is certified that error appears in the above-identified patent and that said Letters Patent is hereby corrected as shown below:

On the title page of the Letters Patent,

Under section "(22)PCT Filed:" change "Aug. 16, 2002" to -- Aug. 6, 2002 --

Signed and Sealed this

Twenty-seventh Day of March, 2007

JON W. DUDAS
*Director of the United States Patent and Trademark Office*